(12) United States Patent
LoPucki

(10) Patent No.: US 8,794,972 B2
(45) Date of Patent: Aug. 5, 2014

(54) SYSTEM AND METHOD FOR ENHANCING COMPREHENSION AND READABILITY OF LEGAL TEXT

(75) Inventor: Lynn M. LoPucki, Los Angeles, CA (US)

(73) Assignee: Lynn M. Lopucki, Los Angeles, CA (US)

( * ) Notice: Subject to any disclaimer, the term of this patent is extended or adjusted under 35 U.S.C. 154(b) by 1283 days.

(21) Appl. No.: 12/187,506

(22) Filed: Aug. 7, 2008

(65) Prior Publication Data

US 2010/0037132 A1 Feb. 11, 2010

(51) Int. Cl.
*G09B 19/06* (2006.01)

(52) U.S. Cl.
USPC ........................................... 434/156

(58) Field of Classification Search
USPC ........................ 434/178, 118, 184
See application file for complete search history.

(56) References Cited

U.S. PATENT DOCUMENTS

| | | | | |
|---|---|---|---|---|
| 3,611,593 | A * | 10/1971 | Shapiro | 434/178 |
| 4,397,635 | A * | 8/1983 | Samuels | 434/178 |
| 4,655,713 | A * | 4/1987 | Weiss | 434/178 |
| 4,887,212 | A | 12/1989 | Zamora et al. | |
| 5,167,504 | A * | 12/1992 | Mann | 434/157 |
| 5,256,067 | A * | 10/1993 | Gildea et al. | 434/169 |
| 5,336,093 | A * | 8/1994 | Cox | 434/178 |
| 5,590,257 | A * | 12/1996 | Forcier | 715/273 |
| 5,651,678 | A * | 7/1997 | Phillips | 434/170 |
| 5,690,493 | A * | 11/1997 | McAlear, Jr. | 434/178 |
| 6,683,611 | B1 | 1/2004 | Cleveland | |
| 6,931,394 | B2 | 8/2005 | Morikage et al. | |
| 7,027,974 | B1 | 4/2006 | Busch et al. | |
| 7,313,513 | B2 | 12/2007 | Kinder | |
| 7,613,731 | B1 * | 11/2009 | Larson | 1/1 |
| 2001/0028603 | A1 * | 10/2001 | Shimazu | 368/10 |
| 2003/0028378 | A1 * | 2/2003 | August et al. | 704/260 |
| 2005/0261891 | A1 * | 11/2005 | Chan et al. | 704/9 |
| 2007/0010993 | A1 | 1/2007 | Bachenko et al. | |
| 2007/0220424 | A1 * | 9/2007 | Shaw et al. | 715/529 |
| 2008/0109479 | A1 * | 5/2008 | Cheng et al. | 707/104.1 |
| 2010/0037132 | A1 * | 2/2010 | LoPucki | 715/269 |
| 2011/0019916 | A1 * | 1/2011 | MacKenzie | 382/187 |

FOREIGN PATENT DOCUMENTS

GB 2433403 6/2007

OTHER PUBLICATIONS

Keesee. "Textbook Highlighting and Marking." revision Oct. 2006.*

* cited by examiner

*Primary Examiner* — Robert J Utama
(74) *Attorney, Agent, or Firm* — Gregory B. Gulliver; The Eclipse Group LLP

(57) ABSTRACT

A standardized parsing and mark-up technique is provided for printings or displays of textual materials, including complex legal documents such as statutes or contracts, to enhance readability and understanding of same. A presentation may be provided in which textual terms indicating if-then statements are enhanced with at least one of a first-level if-then visual marking or a second-level if-then marking throughout the textual material before the text is presented. Textual terms indicating skeletal sentence structures are enhanced with a skeletal sentence visual marking throughout the textual material before the text is presented. A legend for the textual material may be provided having representations of the visual markings and their corresponding meanings.

36 Claims, 5 Drawing Sheets

LEGEND

| | Marking | Name | Description |
|---|---|---|---|
| 101 | ■ | Sentence | Indicates the end of a sentence that is not also the end of a section. |
| 103 | If text [then] | Primary if-then | Indicates the primary if-then structure of the sentence, thus dividing the sentence into separately-analyzable parts. |
| 105 | and | Primary conjunction | Indicates the relationship between the major clauses in a sentence or between subsections in a sentence. |
| 107 | Text | Skeletal sentence | Indicates the main structure of each sentence, if-clause, or then-clause. Highlighting is of the subject, verb, direct object, and articles, adjectives, and adverbs that directly modify any of them. |
| 109 | If text then | Secondary if-then | Indicates an if-then structure within only a portion of the sentence. |
| 111 | (text) | Primary exceptions | Indicates an exception to the entire sentence. |
| 113 | ‹text› | Secondary exceptions | Indicates an exception to only a portion of the sentence. |
| 115 | (text) | Cohesive phrases | Indicates a group of words that should be read and considered as a unit. |
| 117 | and | Secondary conjunctions | Indicates a relationship between listed items or clauses that is important, but does not qualify for primary-conjunction status. |
| 119 | | Custom markings | Readers may use colored pens and highlighters to make additional markings. |

LEGEND

| Marking | Name | Description |
|---|---|---|
| 101 ■ | Sentence | Indicates the end of a sentence that is not also the end of a section. |
| 103 If text [then] | Primary if-then | Indicates the primary if-then structure of the sentence, thus dividing the sentence into separately-analyzable parts. |
| 105 and | Primary conjunction | Indicates the relationship between the major clauses in a sentence or between subsections in a sentence. |
| 107 Text | Skeletal sentence | Indicates the main structure of each sentence, if-clause, or then-clause. Highlighting is of the subject, verb, direct object, and articles, adjectives, and adverbs that directly modify any of them. |
| 109 If text then | Secondary if-then | Indicates an if-then structure within only a portion of the sentence. |
| 111 ◀text▶ | Primary exceptions | Indicates an exception to the entire sentence. |
| 113 ◁text▷ | Secondary exceptions | Indicates an exception to only a portion of the sentence. |
| 115 (text) | Cohesive phrases | Indicates a group of words that should be read and considered as a unit. |
| 117 and | Secondary conjunctions | Indicates a relationship between listed items or clauses that is important, but does not qualify for primary-conjunction status. |
| 119 | Custom markings | Readers may use colored pens and highlighters to make additional markings. |

§ 9-334. Priority of Security Interests in Fixtures and Crops. 107

(a) *Security interest in fixtures under this article.* A security interest under this article may be created in goods that are fixtures [or] may continue in goods that become fixtures. A security interest does not exist under this article in ordinary building materials incorporated into an improvement on land.

101

(b) *Security interest in fixtures under real-property law.* This article does not prevent creation of an encumbrance upon fixtures under real property law.

111

(c) *General rule: subordination of security interest in fixtures.* ❰In cases not governed by subsections (d) through (h)❱, a security interest in fixtures is subordinate to a conflicting interest of (an encumbrancer) [or] (owner) of the related real property other than the debtor.  115   117

(d) *Fixtures purchase-money priority.* ❰Except as otherwise provided in subsection (h)❱, [then] a perfected security interest in fixtures has priority over a conflicting interest of (an encumbrancer) [or] (owner) of the real property if the debtor has an interest of record in [or] is in possession of the real property [and]: 105  103

(1) the security interest is a purchase-money security interest;

(2) the interest of the encumbrancer or owner arises before the goods become fixtures; [and]

(3) the security interest is perfected by a fixture filing (before the goods become fixtures) [or] (within 20 days thereafter).

103

(e) *Priority of security interest in fixtures over interests in real property.* [Then] A perfected security interest in fixtures has priority over a conflicting interest of an encumbrancer or owner of the real property if: 103   117

107

(1) the debtor has an interest of record in the real property [or] is in possession of the real property [and] the security interest:

(A) is perfected by a fixture filing before the interest of the encumbrancer or owner is of record; [and]

115

(B) has priority over any conflicting interest of (a predecessor in title of the encumbrancer or owner);

(2) before the goods become fixtures, the security interest is perfected by (any method permitted by this article) [and] the fixtures are readily removable:

(A) factory or office machines; 117

(B) <u>equipment</u> that is not primarily used or leased for use in the operation of the real property; |or| ~~ 117

(C) <u>replacements</u> of domestic appliances that are consumer goods;

(3) <u>the conflicting interest is a lien</u> on the real property obtained by legal or equitable proceedings after the security interest was perfected by (any method permitted by this article); |or| ~~ 105

(4) <u>the security interest is</u>:

(A) <u>created</u> in a manufactured home in a manufactured-home transaction; |and|

(B) <u>perfected</u> pursuant to a statute described in Section 9-311(a)(2).

(f) *Priority based on consent, disclaimer, or right to remove.* [Then] ⌐103 <u>A security interest</u> in fixtures, whether or not perfected, <u>has priority over a conflicting interest</u> of an encumbrancer or owner of the real property if:

(1) <u>the encumbrancer or owner has</u>, in an authenticated record, <u>consented</u> to the security interest |or| <u>disclaimed an interest</u> in the goods as fixtures; |or| —105

(2) <u>the debtor has a right</u> to remove the goods as against the encumbrancer or owner.

(g) *Continuation of paragraph (f)(2) priority.* [Then] ⌐103 <u>The priority</u> of the security interest under paragraph (f)(2) <u>continues</u> for a reasonable time if <u>the debtor's right</u> to remove the goods as against the encumbrancer or owner <u>terminates</u>.

(h) *Priority of construction mortgage.* [Then] <u>A mortgage is a construction mortgage to the extent that <u>it secures an obligation incurred</u> for the construction of an improvement on land, including the acquisition cost of the land, if <u>a recorded record</u> of the mortgage <u>so indicates</u>.■ ◀Except as otherwise provided in subsections (e) and (f)▶, [then] <u>a security interest</u> in fixtures <u>is subordinate to a construction mortgage</u> if <u>a record</u> of the mortgage <u>is recorded</u> before the goods become fixtures |and| <u>the goods become fixtures</u> before the completion of the construction.■ [Then] <u>A mortgage has this priority</u> to the same extent as a construction mortgage to the extent that <u>it is given to refinance a construction mortgage</u>.

(i) *Priority of security interest in crops.* [Then] <u>A perfected security interest</u> in crops growing on real property <u>has priority over a conflicting interest</u> of an encumbrancer or owner of the real property if <u>the debtor has an interest</u> of record in |or| <u>is</u> in possession of the real property.

(j) *Subsection (i) prevails.* <u>Subsection (i) prevails</u> over any inconsistent provisions of the following statutes: [List here any statutes containing provisions inconsistent with subsection (i).]

FIG. 2B

[*Name and address of secured party*]
[*Date*]

NOTICE OF OUR PLAN TO SELL PROPERTY

[*Name and address of any obligor who is also a debtor*]

Subject: [*Identification of Transaction*]

We have your [*describe collateral*], because you broke promises in our agreement.

[For a public disposition: ]

We will sell [*describe collateral*] at public sale.■ A sale could include a lease or license.■ The sale will be held as follows:

Date: _____
  Time: _____
  Place: _____

You may attend the sale and bring bidders if you want.

[For a private disposition: ]

We will sell [*describe collateral*] at private sale sometime after [*date*].■ A sale could include a lease or license.

The money that we get from the sale (after paying our costs) will reduce the amount you owe.■ If we get less money than you owe, [then] you [will or will not, as applicable] still owe us the difference.■ If we get more money than you owe, [then] you will get the extra money, unless we must pay it to someone else.

You can get the property back at any time before we sell it by paying us the (full amount you owe (not just the past due payments), including our expenses).■ To learn the exact amount you must pay, call us at [*telephone number*].

If you want us to explain to you in writing how we have figured the amount that you owe us, [then] you may call us at " [*telephone number*] [or write us at [*secured party's address*] ] and request a written explanation.■ [[Then] We will charge you $\_\_\_\_\_ for the explanation if we sent you another written explanation of the amount you owe us within the last six months].

If you need more information about the sale [then] call us at [*telephone number*] [or write us at [*secured party's address*].

We are sending this notice to the following other people (who have an interest in [*describe collateral*]) or (who owe money under your agreement):

[*Names of all other debtors and obligors, if any*]

FIG. 3

SYSTEM AND METHOD FOR ENHANCING COMPREHENSION AND READABILITY OF LEGAL TEXT

BACKGROUND

1. Technical Field

The present invention relates generally to a text parsing system and method, and in particular, to a system and method for applying standardized markings to legal textual materials, particularly statutes and contracts, to improve the readability and facilitate the understanding of same.

2. Description of Related Art

Legal texts, particularly statutes (including treaties, rules, regulations, contracts, agreements, and other relationship-governing documents, whether promulgated within or outside the United States) and contracts are notoriously difficult to read. These texts are often the product of negotiation and compromise, so they may be composed hastily, by persons who do not write particularly well, or composed over an extended period of time in which numerous additional terms, conditions, exceptions, etc. are added and revised. In particular, many legal documents include lengthy, complex, compound sentences. Often, a single sentence may contain hundreds of words. The complexity and structure of such legal documents can, if not understood accurately, cause misunderstandings, errors and misinterpretations of intent, which can result in serious legal consequences for the reader.

Thus, in an effort to correctly understand the intent of legal language, readers often read and re-read the documents many times. That is time-consuming, labor-intensive, and frustrating. A single statute or other legal document may be read millions of times by hundreds of thousands of lawyers, judges, law students, and lay persons. The reader may desire to apply a statute to a real or hypothetical case or situation, or simply to gain an understanding of the material. In any event, readers spend substantial, valuable time parsing and attempting to make sense of legal documents. Each reading begins anew with the bare, unmarked text of the statute or contract. The reader often marks up the document in an effort to parse and understand the material during reading. In the case of readers in the legal profession, billions of dollars of time are wasted as each reader repeats similar steps in individually parsing the statute or contract. Such personalized marked-up versions are typically marked ineffectively and in manners understandable only to the readers who marked them. Readers who wish to visually enhance legal documents must each prepare their own versions.

Some drafters and publishers of statutes and contracts have taken steps to try to facilitate the reading of statutory sentences and other legal language by dividing complex sentences or provisions into sections, subsections, and sub-subsections. Each is typically a separate paragraph. That is, a single sentence is divided into several paragraphs. Further, drafters and publishers may indent subsections and double-indentation of sub-subsections, etc., to visually emphasize the differences among them. Captions may be placed in boldface. Drafters may number or letter sections, subsections, and sub-subsections for organizational purposes, and place those numbers and letters in parentheses and/or boldface. While these techniques may provide a somewhat clearer organization of the language of statutes and contracts, nevertheless, they fall far short of solving the problem. Complex legal documents remain difficult to read and understand.

U.S Patent Application No. 2007/0010993 entitled "Method and System for the Automatic Recognition of Deceptive Language" discloses a method for parsing transcribed legal documents such as sworn testimony or depositions in which "deception indicator tags" are inserted that indicate deception in the statement, based on key words, a "part-of-speech" tag, or a phrase of interest. By indicating probable deception, Bachenko makes the statement easier for an investigator to review.

U.S. Pat. No. 7,313,513 entitled "Method for Editing and Enhancing Readability of Authored Documents" describes a method for editing documents which involves scanning a sentence to check for occurrences of each of a plurality of signs and applying sign-dependent logic to the sentence to assess whether the sentence includes unnecessary text and phrases that can be deleted or text that can be improved.

GB 2,433,403 entitled "Displaying Selected Phrases in a Translated Text," teaches a method for parsing and editing text translated between two languages. A part of a first text may be distinguished (e.g., highlighted or underlined) from the rest of the text, which causes the corresponding part of a second translated text to also be distinguished from the rest of the second text.

U.S. Pat. No. 6,683,611 entitled "Method and Apparatus for Preparing Customized Reading Material" describes a method of producing reading materials in which the portion of a story associated with various reading characters is displayed in a different color, indicia, or representation so that each reader in a group can read the parts of specific characters throughout the book and easily follow along.

Accordingly, a system and method for improving the readability and comprehension of legal documents, particularly statutes and contracts, in an effective and efficient manner, without altering the meaning or intent of the language, is highly desirable.

SUMMARY OF THE INVENTION

The present invention is directed to a system and method for providing a standardized parsing and mark-up technique in printings or displays of textual materials, particularly complex legal documents, to enhance readability and understanding of same. The markings are applied throughout the textual material preferably before the material is presented to a reader. While the present invention is particularly adapted for use with legal documents, and particularly for use with statutes and contracts because of the inherently complex yet logical "if-then" structure of these writings, the present invention may also be used for any other types of reading materials that contain complex language which is desired to be broken down into an easier-to-read format.

According to an aspect of the present invention, the standardized marking system provides a consistent format which renders the statute or contract easier and quicker to read by all future readers by visually isolating each sentence and revealing certain aspects of the sentence's structure. The markings may be varied in levels of visual prominence corresponding with the level of the term's structure or significance. A legend may be provided with each document listing the symbols/markings and their various corresponding meanings.

A reader who can see the identified aspects of sentence structure can more quickly understand the sentence. If the same markings are used to highlight the same characteristics in numerous sentences, the reader can develop personal skills and techniques for using the markings to read the marked documents more quickly and with better comprehension. For example, one such technique is to begin reading a sentence at the beginning of a primary "if" clause, regardless of the position of that "if" clause in the sentence.

In one aspect of the present invention, a presentation of textual material is provided, wherein sentences containing multiple independent clauses are enhanced with primary visual markings and most or all sentences or independent clauses are enhanced with secondary markings throughout the textual material before the text is presented. In particular, textual terms comprising skeletal sentence structures are enhanced with skeletal sentence visual markings throughout the textual material before the text is presented.

According to another aspect, a method of presenting textual material is provided comprising the steps of enhancing occurrences of textual terms in sentences containing multiple independent clauses with primary visual markings throughout the textual material before the text is presented, and enhancing occurrences of textual terms in most or all sentences or independent clauses that are secondary features (including skeletal sentences) with secondary visual markings before the text is presented.

Some exemplary terms used in this disclosure may be defined as follows:

"Primary structure:" comprises primary (i.e., first-level) if-then divisions, primary (i.e., first level) conjunctions, and primary (i.e., first level) exceptions.

"Secondary structure:" comprises skeletal sentences, secondary (i.e., second-level) if-then divisions, secondary (i.e., second-level) exceptions, and secondary (i.e., second-level) conjunctions.

"Primary (i.e., first-level) if-then markings:" indicate the primary if-then structure that divides the sentence into independent clauses which may be analyzed separately.

"Primary (i.e., first level) conjunction markings:" indicate the relationship between the major clauses in a sentence or between subsections in a sentence.

"Primary (i.e., first level) exception markings:" indicate an exception to application of the entire sentence.

"Skeletal sentence:" indicates the main structure of each sentence, if-clause, or then clause. The skeletal sentence includes the subject, verb, direct object, and may also include any articles, adjectives and adverbs that directly modify any of them.

"Secondary (i.e., second-level) if-then markings" indicates an if-then structure within only a portion of the sentence.

"Secondary (i.e., second-level) conjunction markings:" indicate a relationship between listed items; multiple subjects, verbs or direct objects; or sub-subsections that is important, but does not qualify for first-level conjunction status.

Secondary (i.e., second level) exception markings:" indicates an exception to only a portion of the sentence.

According to one example, the present invention provides a system and method for an initial marking-up or parsing of a legal document, such as statutory text, prior to the time of printing, publication or display. The markings that embody the parse are preferably in a standardized format that are easily distinguished from the text of the legal document itself and do not interfere with or impede the ability of a reader to add his/her own additional, customized markings.

According to one aspect of the present invention, a presentation of textual material in legal documents is provided, wherein textual terms indicating features of sentence structure are enhanced with visual marking throughout the textual material before the text is presented, to facilitate reader comprehension.

According to another aspect of the present invention, a presentation of textual material is provided, wherein textual terms indicating if-then statements and skeletal sentence structures are enhanced with visual marking throughout the textual material before the text is presented.

According to yet another aspect of the present invention, a method of presenting textual material is provided comprising the steps of enhancing occurrences of textual terms indicating if-then statements throughout the textual material before the text is presented, and enhancing occurrences of textual terms indicating skeletal sentence structures with a skeletal sentence visual markings throughout the textual material before the text is presented.

According to yet another aspect of the present invention, a method of presenting textual material in legal documents is provided comprising the steps of selecting a system of font and text characteristics for use as visual markings to represent features of sentence structure, and applying those markings consistently throughout the textual material before the material is presented to enhance reader comprehension.

These and other aspects, features, and advantages of the present invention will be described or become apparent from the following detailed description of the preferred embodiments, which is to be read in connection with the accompanying drawings.

BRIEF DESCRIPTION OF THE DRAWINGS

FIG. 1 is a depiction of a sample legend showing various exemplary markings for parsing a text and their corresponding names and descriptions according to an aspect of the present invention;

FIGS. 2A-2B is an exemplary excerpt of a statute marked-up to parse its textual language in accordance with the legend of FIG. 1;

FIG. 3 is an exemplary legal notice marked up to parse its textual language in accordance with the legend of FIG. 1.

DETAILED DESCRIPTION OF PREFERRED EMBODIMENTS

Figure 4:
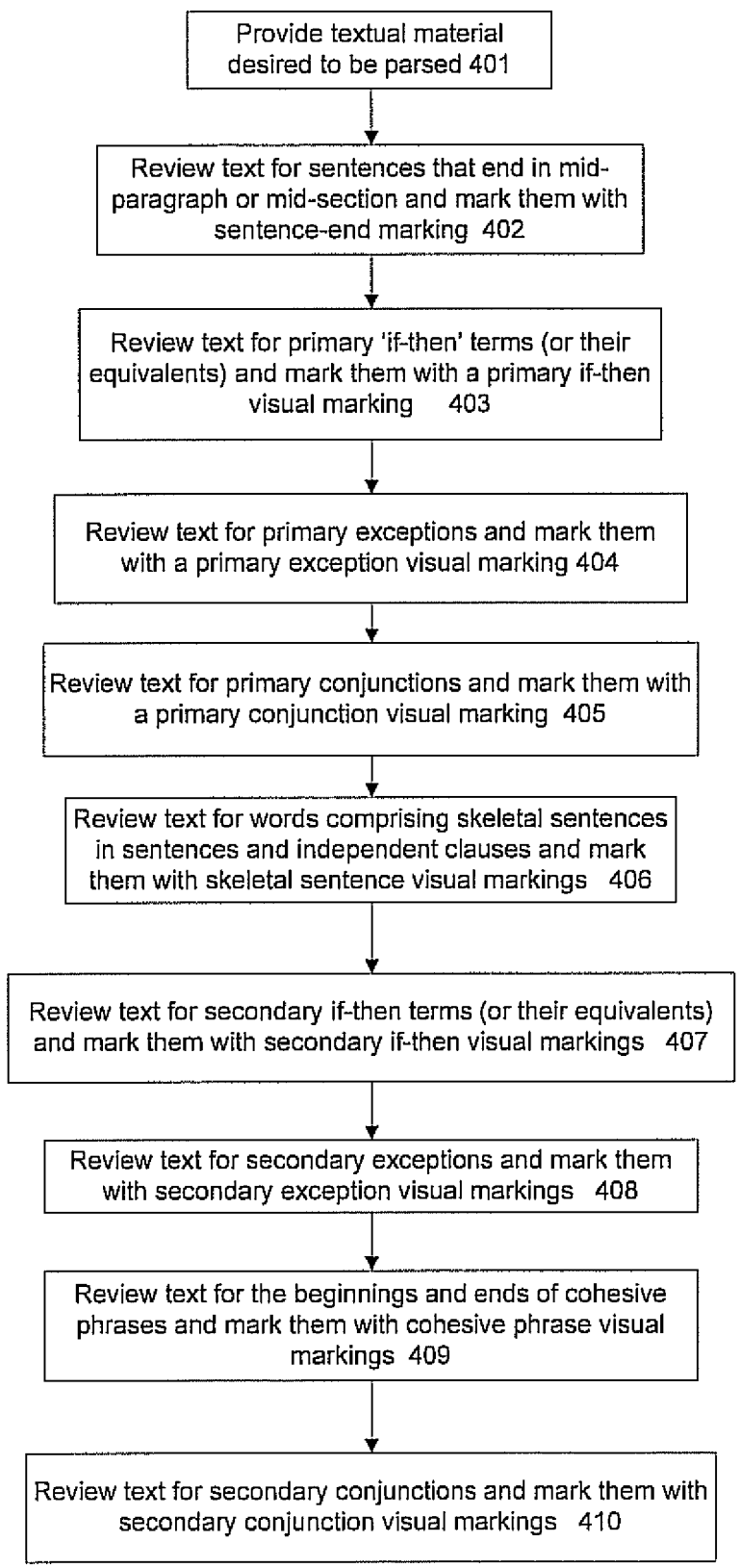
FIG. 4 is an exemplary method flow for parsing textual documents to indicate and emphasize the structure and relationships of phrases and sentences according to an aspect of the present invention.

It is to be understood that the exemplary system modules and method steps described herein may be implemented in various forms, including manually or via hardware, software, firmware, special purpose processors, or a combination thereof. Preferably, the present invention is implemented in software as an application program tangibly embodied on one or more program storage is devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate or practice these and similar implementations or configurations of the present invention.

FIG. 1 is a depiction of a sample legend showing various exemplary markings for parsing a text and their corresponding descriptions according to an aspect of the present invention. However, markings which may be used in accordance with the present invention are not limited to those shown in FIG. 1. The term "markings" as used herein may comprise any type of indicia, e.g., punctuation effects, font style and font effects, underlining, capitalization, letter styles, colors, color highlights, shadowing, grey-scale, raised text, etc. A variety of text characteristics can be used to highlight words, including but not limited to boldface, italics, parentheses, brackets, color, and shading, used in various combinations. It is noted that any type of markings, font effects, capitalization, letter styles, or other indicia may be used to visually distinguish the desired text in the document and thus effectuate the parsing, and the markings shown in FIG. 1 are for exemplary and illustrative purposes only. Principles of the present invention are compatible with and indeed, preferably best used in conjunction with other, existing techniques, such as subparagraph indentations, paragraph separations, and paragraph numbering and lettering.

In addition or alternatively, colors may be used to highlight and distinguish the desired text. Colors may be user-defined or pre-determined and applied in accordance with a provided legend or key.

Still other methods can be used to indicate that the reader should treat a group of words as a single unit or phrase. The beginning of the phrase can be marked with a symbol, such as an open parenthesis, and the end of the phrase can be marked with a similar symbol, such as a closing parenthesis. The font of the words in the phrase can be shaded (e.g., 50% shading), or the background for that font can be shaded (e.g. 12.5%).

Any other type of sentence structure, grammatical notation, visual aids, etc., in a document, aside from those shown for exemplary purposes herein, may be enhanced and marked with any desired indicia.

While a system and method according to the present principles is particularly described with respect to application to legal documents such as statutes, contracts, etc., it is to be noted that application of the present principles to any type of textual material or document, e.g., in which reading and comprehension is desired to be improved, may be contemplated.

Legal documents such as statutory material can be particularly difficult to read, because the sentences are often lengthy, complex, and ambiguous. One does not read a complex statutory provision so much as one analyzes it. A marking and parsing system and method according to the present principles essentially accomplishes four goals. First, they divide the statute into sentences and clauses that can each be analyzed separately. Second, they show the skeletal sentence structure within independent clauses. Third, they indicate the beginnings and ends of cohesive phrases that should be read as single units. Fourth, they show the relationships among those sentences, clauses, and phrases.

For example, a system and method according to the present principles may employ about ten different types of markings to distinguish between the following types, structures, and forms of text in legal material. It is noted that the terms "first-level" and "primary" may be used interchangeably herein. In addition, the terms "second-level" and "secondary" may be used interchangeably herein.

1. Sentences: Sentences are the fundamental building blocks of statutory material. Each can and should be analyzed separately. Legal documents such as statutes are typically composed of many sentences arranged in paragraphs, or 'sections.' To analyze a sentence in a legal document, the reader must first know where it begins and ends. That can be difficult because sentences in legal documents often run across the visual boundaries of sections and subsections, and periods which are typically used to indicate the end of a sentence are so small as to be nearly invisible. As shown in FIG. 1, a sentence termination marking 101 may be provided for indicating the end of a sentence in a legal document, and is preferably added after an existing period. Such marking 101 preferably comprises a large, visually distinct form which adds visual emphasis, such as a solid black box. Other types of markings may be used, such as solid enlarged forms in any shape (e.g., circles, triangles, hexagons, etc.) and/or may include color, shading, etc.

According to a preferred embodiment, if a sentence ends within a section or paragraph of the document, the sentence termination marking 101 is applied. If a sentence ends at the end of a section, or subsection in the document, the application of the marking 101 is unnecessary.

Readers will use the sentence termination marks by first noting visually where each sentence begins and ends. That enables them to ignore other surrounding sentences and materials until they grasp the meaning of the current sentence.

2. First-level "if-then" clauses: Sentences in legal documents such as, e.g., statutes and contracts, typically differ from sentences in other types of writings in that the former are, by nature, requirements or commands. For example, every statute can be viewed as a legislative command that if certain conditions are met, then certain consequences should follow. Each sentence, explicitly or implicitly, indicates the circumstances under which it applies. If those circumstances are not present, the statute does not apply. Each sentence, explicitly or implicitly, also indicates the consequences of its application. Many statutes begin with the word "if" followed by a clause that specifies those conditions (the "if-clause"), and finish with the word "then" followed by a clause that specifies those consequences (the "then-clause"). Together, the two clauses comprise the entire sentence. Such sentences comprise logical if-then statements. The division into an if-clause and a then-clause is the main part of the primary structure of sentences in legal documents. According to one aspect of the present invention, the "primary structure" of the document is marked, i.e., textual terms (express or implied) indicating first level if-then statements are marked and emphasized throughout the document. For example, first level if-then structures may be marked using the first-level if-then markings shown as 103 in FIG. 1.

Each if-clause and then-clause is typically an independent clause. That is, each has the structure of an independent sentence in that each contains a subject, a verb, and perhaps a direct object or subject complement. Such an "if" or "then" clause could be made into an independent sentence without altering its meaning. For example, a statute might state:

"If the debtor has rights in the collateral, then a security interest is enforceable."

This phrase is composed of the following two individually complete sentences:

1. "The debtor has rights in the collateral,"
2. "A security interest is enforceable"

The appearance of the word "if" commences an "if" clause and the word "then" commences a "then" clause. Accordingly, the words "if" and "then" are distinguished or highlighted throughout the text where they are used in this manner. For example, a primary if-then marking 103 may be applied, using boldface, underlining and brackets if the word is inserted. Advantageously, this visually prominent marking indicates to the reader the primary "if-then" structure of a sentence, thus dividing the sentence clearly into two parts which may be separately analyzed. For example, the above sample phrase may be marked up as follows:

---

"If the debtor has rights in the collateral, then a security interest is enforceable."

This simple if-then structure (referred to here as a "first-level" or "primary" if-then structure) may be marked up in any desired way, e.g., by making the "if" and "then" boldface and bright red.

Note that the exact words "if" and "then" do not appear in every statute. First, statute drafters often substitute equivalent words for "if," such as "even if," "when," "while," "during," "whenever," "until," "unless," and "to the extent that." These terms and any other equivalent terms are marked in the same manner as "if." In FIG. 2B, an exemplary insertion of the phrase "to the extent that" 201 is shown, and provided in bold print for indicating its insertion. Second, the word "then" is often implied, and does not appear outright. For example:

"If the debtor has rights in the collateral, a security interest is enforceable."

In situations where sentences include an implied "then," the word then" may be added in the appropriate location in the sentence, with brackets placed around it to indicate that it does not literally appear in the statute, yet is implied. That is, in many instances, the words "if" or "then" are implicit. In that event, the words "if" and "then" may be inserted at the appropriate locations in the text. Their insertion may be indicated by any method for indicating that words have been inserted into material written by others. For example, one method is to place the added word in brackets. For example:

"If the debtor has rights in the collateral, [then] a security interest is enforceable."

Inserting the necessary words does not, however, always enhance readability and understanding. In some instances, it may even detract from readability and understanding.

Uniform Commercial Code §1-101 may be an example. That section states that "This Act may be cited as the Uniform Commercial Code." This statement is short and easy to understand without highlighting. To render that statement an if-then statement, one must imply a large portion of the result: "[If it is] this Act [then it] may be cited as the Uniform Commercial Code."

The larger the portion of the if-then structure that is implied, the greater the risk that rendering the implied expression will alter the meaning of the statute. Judgment must be exercised to determine whether the readability and understanding of any particular sentence will be improved by the method, without unacceptable risk of altering or confusing its meaning. In the preferred embodiment, if there is significant risk of confusion and/or altering the meaning, the method should not be applied to that sentence.

3. First-level conjunctions: First level conjunctions are part of the "primary structure" of a sentence. A sentence that is in the form of an if-then statement may have multiple if clauses, multiple then-clauses, or both. Multiple if-clauses may present multiple or alternative conditions which must be met for a primary consequence to follow. Multiple then-clauses may present multiple or alternative consequences that follow if the if-clause conditions are met. In either situation, the statute almost certainly will contain a conjunction (typically the word "and" or "or") that indicates whether the conditions are multiple or alternative. If the sentence contains a conjunction (nearly always "and" or "or") that specifies the logical relationship between the "if" clauses or between the "then" clauses, the conjunction is preferably marked as a primary conjunction.

These "first-level" conjunctions indicate the relationships among and between first-level if-clauses or then-clauses. Primary conjunction markings 105 may be used to mark first-level conjunction terms by, for example, making them boldface within a linear box. Use of a different color/style font may also be contemplated. The implicit "if" or "then" may be made explicit by inserting it in brackets and marking if as a primary if or then 103. For example, a sentence is that reads:

"If value has been given and the debtor has rights in the collateral, then the security interest is enforceable.

might be marked:

"If value has been given and [if] the debtor has rights in the collateral, then the security interest is enforceable."

First-level conjunction markings 105 may also be applied to conjunctions that indicate the relationship between the principal subsections of a section of the document. For example:

"[Then] A security interest is enforceable only if:
(1) value has been given;
(2) the debtor has rights in the collateral and
(3) the debtor has authenticated a security agreement that provides a description of the collateral."

Primary conjunction markings effectively divide the sentence into additional parts that the reader can analyze separately. Readers should treat primary conjunctions dividers that are on the same level with primary "if-then" structures and primary exceptions, and superior to all other sentence dividers.

4. First-level exceptions: A first-level exception is an exception that applies to the entire sentence. That is, if the terms of the exception are met, the sentence does not apply. First-level exception markings 111 may be used to distinguish the exception phrases and may comprise, e.g., prominent parentheses that appear as half-circles to mark the beginning and end of each first-level exception clause. For example:

"(2) "Account": ❨except as used in "account for"❩, means a right to payment of a monetary obligation..."

Primary exception markings 111 can be used to signal to the reader that the reader can ignore these clauses until the reader has otherwise completed the reader's analysis of the sentence. (Such first-level exceptions might also be considered to be additional, but negative, 'if' clauses, e.g., "if not [a] and if [b], then [c].")

Depending on the circumstances that brought the reader to the statute, the reader can either (1) analyze the section, ignoring the exception language until the analysis is complete, or (2) analyze the exception, ignoring the remainder of the sentence until the reader determines whether the exception has rendered it irrelevant.

5. Skeletal sentences: A "skeletal sentence" includes the subject, verb, and direct object (or subject complement) of a more extensive sentence. Optionally, the skeletal sentence may be treated as including some or all of the articles, adjectives, and adverbs that directly modify the subject, verb, or direct object. The words that comprise a skeletal sentence may be marked by a skeletal sentence marking. FIG. 1 shows the skeletal sentence as marked by underlining 107. Alternatively, the skeletal sentence markings 107 might, for example, be a colored background shading. The skeletal sentence is part of the secondary structure of the sentence.

If a sentence has multiple subjects, verbs, or direct objects, either the first of each may be marked, or all may be marked. Advantageously, skeletal sentence markings 107 visually accentuate and emphasize the main part of each sentence to the reader—that is, a complete thought—which indicates what the sentence generally does or means. In addition, it visually distinguishes the main part of the sentence from the usually more complex prepositional phrases and dangling clauses that fill out the sentence, which might be distracting to the reader.

If the same marking used to mark the subject, verb, and direct object (or subject complement) is also used to mark articles preceding the subject or object, the intervening adjectives, and any adverb adjacent to the verb, the reader will experience the skeletal sentence as a sentence. This further contributes to quick understanding of the material.

For example,

---

Except as otherwise provided in subsection (g), [then] a perfected purchase-money security interest in goods other than inventory or livestock has priority over a conflicting security interest in the same goods, and, except as otherwise provided in Section 9-327, a perfected security interest in its identifiable proceeds also has priority, if the purchase-money security interest is perfected when the debtor receives possession of the collateral or within 20 days thereafter.

--- becomes:

---

Except as otherwise provided in subsection (g), [then] a perfected purchase-money security interest in goods other than inventory or livestock has priority over a conflicting security interest in the same goods, and, except as otherwise provided in Section 9-327, a perfected security interest in its identifiable proceeds also has priority, if the purchase-money security interest is perfected when the debtor receives possession of the collateral or within 20 days thereafter.

---

Readers using skeletal sentence marks may begin by noting the position of each sentence termination mark 101, each primary if or then marking 103, and each primary conjunction. The group of words between any two such marks are a sentence or an independent clause that can be read as a sentence. Within each such group, the smaller number of words marked that constitute the skeletal sentence are marked as the skeletal sentence 107. Readers benefit because they can more easily focus on each such sentence or independent clause individually. They can read the skeletal sentence first to understand generally what the sentence does or means. They can then consider how the remaining words of the sentence change or add to its meaning. Often, the skeletal sentence alone makes little sense, and qualifications provided in the remaining words of the sentence are crucial to understanding the sentence.

6. Secondary if-then clauses: A secondary if-then clause indicates an "if-then" structure that operates within only a portion of the sentence. Either these structures do not divide the sentence into sub-sentences that can be analyzed in isolation, or they relate only to a part of the sentence. That is, such a secondary if-clause states a condition that, if met, results not in the primary consequence, but in some lesser, subordinate consequence. The lesser consequence, for example, may be that one element of the first-level "if" clause need not be satisfied. For example, the sentence structure may be "If (a) and If (b) then (c) then (d)." In that structure, the double-underlined "if" and "then" are second level. If the condition (b) is not met, then the second level consequence, (c), is not a condition of (e).

Secondary if-then markings 109 may be any type of marking, but are preferably of the same general type as first level if-then markings 103, but noticeably less prominent. For example, if primary if-then markings 103 are a bright red bold font, secondary if-then markings 109 may be a bright red regular font. Complete sentences usually do not exist within secondary if-then clauses, so skeletal sentences are not present. Even when they are present, the skeletal sentences are not indicated. For example:

---

Conflicting security interests held by secured parties each of which has control under Section 9-106 rank according to priority in time of:
    (A) if the collateral is a security, [then] obtaining control;
    (B) if the collateral is a security entitlement carried in a securities account then ...

---

To use secondary if-then structures, readers might first locate the second level "if" and corresponding "then" terms. They might then consider each clause separately, while keeping in mind that elements of the clause may be implied from and so are found in, other parts of the sentence.

7. Second-level exceptions: A second-level exception is an exception clause that does not apply to the entire sentence, but only applies to a portion of the sentence. Secondary exception markings 113 may be used to distinguish such exception clauses. Preferably, the markings used as secondary exception markings 113 are subordinate to and not as prominent as the primary exception markings 111. For example, secondary exception markings 113 may indicate the beginning and end of significant secondary exceptions with pointed parentheses. For example:

---

◀Except as otherwise provided in subsection (g)▶, [then] a perfected purchase-money security interest in goods other than inventory or livestock has priority over a conflicting security interest in the same goods, and, ◀except as otherwise provided in Section 9-327▶, a perfected security interest in its identifiable proceeds also has priority, if the purchase-money security interest is perfected (when the debtor receives possession of the collateral) or (within 20 days thereafter).

---

Generally, readers cannot ignore a marked secondary exception in analyzing the sentence, but can ignore it until after the reader has analyzed the part of the sentence to which it applies.

8. Cohesive phrases: A cohesive phrase is a group of words that are best read and understood as a single unit. The beginnings and ends of cohesive phrases may be marked by a cohesive phrase marking such as 115 shown in FIG. 1 (bold parentheses from a different font set), or any other desired indicia. It may be helpful to think of the entire cohesive phrase as a multi-word noun. The cohesive phrase may comprise two or three words, or it may continue for several lines of text. Each cohesive phrase may have its own, complex structure within it (in the preferred embodiment, that internal structure is not marked). To determine where a cohesive phrase begins or ends may be difficult and often depends on the exercise of human judgment. For example:

> [A] security interest (in goods covered by a certificate of title) which is perfected (by any method under the law of another jurisdiction)when (the goods become covered by a certificate of title from this State) remains perfected until (the security interest would have become unperfected under the law of the other jurisdiction had the goods not become so covered).

Cohesive phrases may be nested one within another. In addition, they may overlap with skeletal sentences. In both cases, the preferred embodiment is to not mark the nested or overlapping cohesive phrases.

Cohesive phrases often appear in lists of two or more items, joined by a conjunction. In these instances, each cohesive phrase can be marked separately and the conjunction can be marked or highlighted. If the cohesive phrases are lengthy and more than two appear in the same list, the conjunction can be repeated (in brackets to indicate its addition) between each pair of cohesive phrases. For example:

> "Chattel paper" means a record or records that evidence both (a monetary obligation) and (a security interest in specific goods, a security interest in specific goods and software used in the goods, a security interest in specific goods and license of software used in the goods, a lease of specific goods, or a lease of specific goods and license of software used in the goods).

To analyze the part of a sentence that contains a cohesive phrase, the reader might begin by reading and understanding the phrase as a unit. Then, the reader would consider that unit in the context of the entire sentence. If multiple cohesive phrases appear in a list, the reader might examine the context of the sentence to determine the consequence or significance of appearing on the list.

9. Second-level conjunctions: A conjunction is a second level conjunction if it indicates an important relationship, but one that is subordinate to a first-level conjunction. Second-level conjunctions typically comprise the words "and" or "on" and may be used and applied in various ways. For example, in skeletal sentences, they may be used to indicate the relationship between multiple subjects, verbs or direct objects. Second, in lists composed of multiple cohesive phrases, they may be used to indicate the relationship among the cohesive phrases. Third, where first-level conjunctions are used to indicate the relationships among subsections, second-level conjunctions may be used to indicate the relationships among sub-subsections.

Secondary conjunction markings 117 are used to highlight the second-level conjunction in a way which is preferably distinguishable from, and less prominent than, primary conjunctions markings 105. For example, while primary conjunction markings 105 may comprise a standard-size bolded font within a box, secondary conjunction markings 117 may comprise a smaller-sized non-bolded font within a box. To illustrate:

> The term does not include (i) charters or other contracts involving the use or hire of a vessel or (ii) records that evidence (a right to payment arising out of the use of a credit or charge card or (information contained on or for use with the card).

Secondary conjunctions that appear within the bounds of a skeletal sentence should be read as part of the skeletal sentence (unless the context otherwise requires). Secondary conjunctions that appear after a closed parenthesis and before an open parenthesis should be read as indicating the relationship between cohesive phrases. The "and" in the phrase "(a) and (b)" exemplifies this.

10. Custom markings: Readers may further add their own markings to the document in addition to any of the above markings. For example, readers may wish to highlight words that are not included in the skeletal sentence, but that are crucial to the meaning of the sentence. Readers who seek to apply a statute to a particular case or hypothetical case may wish to underline the specific words that apply.

The particular methods of implementation of the present invention may be customized, varied or altered, depending on the type of readers who will be using or reading the text. For example, law students who purchase a statutory supplement for one of their courses are likely to wish to make personal markings in the statutes or contracts, by underlining words or highlighting words using a yellow or pink marker. Preferably, the markings provided according to the present invention in such a supplement should not use colored underlining, or background highlighting in yellow or pink.

In another example, statutes printed for sale principally to law firms and libraries might preferably use background highlighting in colors because users of those printings are unlikely to highlight their copies. Such statutes probably should not be highlighted by underlining because underlining is frequently used by drafters and publishers as indicating words inserted during revision of a statute. The conjunction of those different uses may cause confusion and misinterpretation.

FIGS. 2A-2B is an exemplary excerpt of a legal document, e.g., Article 9 of the Uniform Commercial Code, marked-up to parse its textual language in accordance with the legend of FIG. 1. Exemplary use of the markings of FIG. 1 is shown and demonstrated.

As another example, FIG. 3 is an exemplary legal notice marked up to parse its textual language in accordance with the legend of FIG. 1.

FIG. 4 is an exemplary method flow for parsing textual documents to indicate and emphasize the structure and relationships of phrases and sentences according to an aspect of the present invention. The order of the steps shown in FIG. 4 are by way of example and not limitation. Namely, steps 402-410 may be performed or exercised in any desired order. However, the steps shown in FIG. 4 are exemplary and indicate that characteristics may be marked in this is order:

1) Sentence endings
2) Primary ifs and thens
3) Primary exceptions
4) Primary conjunctions
5) Skeletal sentence structures
6) Secondary ifs and thens
7) Secondary exceptions
8) Cohesive phrases
9) Secondary conjunctions
10) Custom markings The markings applied at any of the steps may comprise any types of markings that visually emphasize the text, such as boldface, text effects, font styles, symbols, etc. Preferably, the same types of markings are used consistently throughout a given material for each type of text which is desired to be emphasized, so as to provide a standardized marking system. Human judgment may be applied and exercised to determine whether to mark or emphasize particular textual terms (that is, to determine whether the terms meet the desired criteria for marking).

For any given text which is desired to be parsed (step 401), the text is reviewed for sentence endpoints, and in step 402, sentence termination markings are added to the end of each sentence. Preferably, the sentence termination markings are only added to the end of sentences which end in the middle of a section or paragraph. If the end of the sentence coincides with the end of a paragraph or section, a sentence termination marking is not needed.

In step 403, the text is reviewed for occurrences of primary 'if-then' structures. As discussed previously, primary ifs or thens divide sentences into if-clauses that explicitly or implicitly indicate the circumstances under which the sentences apply and then-clauses that explicitly or implicitly indicate the consequences of the sentences' application. The words "if" or "then" are not necessarily always used, and thus the text is also searched for the existence of other if-then statements. Those equivalents may use alternate terms for "if" and "then" or "if" or "then" may be implied.

In step 403, primary if-then statements, are visually marked. That includes the word "if" or "then" and equivalent terms, such as "while" or "during." Any type of marking may be used, as discussed above. Such marking may be further distinguished as being a first level if-then marking. Preferably, first level if-then markings are noticeably more prominent than second level if-then markings. If the if-then terms are only implied but not shown in the text, then the literal 'if' or 'then' term may be added to the sentence with an additional marking to show that it was added.

In step 404, the beginnings and ends of primary exception clauses are marked with primary exception markings. As discussed above, primary exception clauses are clauses which state exceptions from the operation of the entire sentence. Preferably, first level exception markings are made to be more prominent than second level exception markings.

In step 405, any occurrences of primary conjunctions are marked with a primary conjunction marking. As discussed above, primary conjunctions divide the sentence by indicating the relationship among independent clauses.

In step 406, the skeletal terms in each sentence of the text are marked. Skeletal terms may include the subject, verb and direct object of each independent clause framed by first-level markings. Articles, adjectives and adverbs that directly modify the subject, verb or direct object may also be marked as skeletal terms. The skeletal terms indicate the main structure of each sentence.

In step 407, any occurrences of secondary if-then clauses are marked with a secondary if-then clause marking. As discussed above, secondary ifs and thens divide clauses, but do not divide entire sentences.

In step 408, any occurrences of secondary exceptions are marked with secondary exception markings. As discussed above, secondary exceptions are exceptions from the operation of part, but not all of the sentence.

In step 409, the beginning and end of some, but not all cohesive phrases are marked with cohesive phrase markings. As discussed above, cohesive phrases typically comprise a group of words that should be read and understood as a unit, and may be nested within each other, and/or be overlapping. Those that are nested or overlapping generally are not marked.

In step 410, any occurrences of secondary conjunctions are marked with secondary conjunction markings. As discussed above, secondary conjunctions indicate the relationships among multiple subjects, verbs, or direct objects of a skeletal sentence, the relationships among cohesive phrases in a list, or the relationships among sub-subsections where the relationship among sections has been marked as a primary conjunction.

In step 411, a legend or key may be prepared showing the visual representations of all the markings used in the textual material, together with a listing of each marking's corresponding description and meaning. Each textual material or document may be provided with its own legend, with standardized markings applied throughout its text. The legend may be appended to the textual material, or appear on each page of the document itself.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

What is claimed is:

1. A method of enhancing the readability of legal text placed upon a document wherein the legal text includes one or more sentences comprising the steps of:

parsing the legal text by a processor to identify one or more portions of legal text for visual enhancement;

selecting one or more visual markings from a set of visual markings that visually enhance individual portions of the legal text that was parsed using a processor when the one or more visual markings are applied to the legal text prior to placement of the legal text in the document and where the legal text contains English language grammar;

applying one of the visual markings to the legal text such that at least one of the portions of the legal text are visually enhanced;

wherein the one or more portions of legal text include at least one of (a) a primary if-then clause, (b) a secondary if-then clause, (c) a primary conjunction, (d) a secondary conjunction, (e) a primary exception, (f) a secondary exception, (g) a skeletal sentence portion, and (h) a cohesive phrase; and wherein the set of visual markings includes at least one of (i) a sentence termination marking, (ii) a primary if-then marking, (iii) an explicit if-then marking, (iv) a secondary if-then marking, (v) a primary conjunction marking, (vi) a secondary conjunction marking, (vii) a primary exception marking, (viii) a secondary exception marking, (ix) a skeletal sentence marking, and (x) a cohesive phrase marking in addition to text characters being added within the document without modification of the paragraphing employed in the document.

2. The method of claim 1 further comprising the steps of:
displaying a legend with the legal text; and
wherein the legend includes individual visual markings of the set of visual markings and respective descriptions of the individual visual markings.

3. The method of claim 1 further comprising the steps of:
determining whether one of the sentences in the legal text includes a primary if-then clause; and
in response to a determination that one of the sentences in the legal text includes a primary if-then clause, applying the primary if-then marking to the legal text such that the primary if-then clause is visually enhanced.

4. The method of claim 3 further comprising the steps of:
determining whether one of the sentences in the legal text includes a secondary if-then clause; and
in response to a determination that one of the sentences in the legal text includes a secondary if-then clause, applying the secondary if-then marking to the legal text such that the secondary if-then clause is visually enhanced.

5. The method of claim 3 further comprising the steps of:
determining whether the primary if-then clause is an implicit if-then clause; and
in response to a determination that the primary if-then clause is an implicit if-then clause, applying the explicit if-then marking to the legal text such that the implicit if-then clause is transformed into an explicit if-then clause.

6. The method of claim 1 further comprising the steps of:
determining whether one of the sentences in the legal text includes a primary conjunction; and
in response to a determination that one of the sentences in the legal text includes a primary conjunction, applying the primary conjunction marking to the legal text such that the primary conjunction is visually enhanced.

7. The method of claim 6 further comprising the steps of:
determining whether one of the sentences in the legal text includes a secondary conjunction; and
in response to a determination that one of the sentences in the legal text includes a secondary conjunction, applying the secondary conjunction marking to the legal text such that the secondary conjunction is visually enhanced.

8. The method of claim 6 wherein the primary conjunction marking comprises a box that surrounds the primary conjunction.

9. The method of claim 1 further comprising the steps of:
determining whether one of the sentences in the legal text includes a primary exception clause; and
in response to a determination that one of the sentences in the legal text includes a primary exception clause, applying the primary exception marking to the legal text such that the primary exception clause is visually enhanced.

10. The method of claim 9 further comprising the steps of:
determining whether one of the sentences in the legal text includes a secondary exception clause; and
in response to a determination that one of the sentences in the legal text includes a secondary exception clause, applying the secondary exception marking to the legal text such that the secondary exception clause is visually enhanced.

11. The method of claim 9 wherein the primary exception marking comprises a first half-circle positioned at a beginning of the primary exception clause and a second half-circle positioned at an ending of the primary exception clause.

12. The method of claim 1 further comprising the steps of:
identifying a location in the legal text where one of the sentences ends; and
applying the sentence termination marking at the location in the legal text where the sentence ends such that the location is visually enhanced.

13. The method of claim 1 further comprising the steps of:
determining whether one of the sentences in the legal text includes a cohesive phrase; and
in response to a determination that one of the sentences in the legal text includes a cohesive phrase, applying the cohesive phrase marking to the legal text such that the cohesive phrase is visually enhanced.

14. The method of claim 3 wherein the primary if-then marking comprises a pair of brackets wherein individual brackets in the pair of brackets are respectively positioned on each side of the primary if-then clause.

15. The method of claim 4 wherein the secondary if-then marking is less visually prominent relative to the primary if-then marking.

16. The method of claim 7 wherein the secondary conjunction marking is less visually prominent relative to the primary if-then marking.

17. The method of claim 16 wherein the secondary conjunction marking comprises a box that surrounds the secondary conjunction.

18. The method of claim 10 wherein the secondary exception marking is less visually prominent relative to the primary exception marking.

19. The method of claim 18 wherein the secondary exception marking comprises a first triangle positioned at a beginning of the secondary exception clause and a second triangle positioned at an ending of the secondary exception clause.

20. The method of claim 13 wherein the cohesive phrase marking comprises a pair of parentheses wherein individual parentheses in the pair of parentheses are respectively positioned on each side of the cohesive phrase.

21. The method of claim 1 further comprising the steps of:
determining whether the legal text includes a skeletal sentence portion; and
in response to a determination that the legal text includes a skeletal sentence portion, applying the skeletal sentence marking to the legal text such that the skeletal sentence portion is visually enhanced.

22. The method of claim 21 wherein the skeletal sentence marking comprises an underlined typeface.

23. A non-transitory computer readable media containing instructions for a method of enhancing the readability of legal text placed upon a document wherein the legal text includes one or more sentences comprising the steps of:
parsing the legal text by a processor to identify one or more portions of legal text for visual enhancement;
selecting one or more visual markings from a set of visual markings that visually enhance individual portions of the legal text that was parsed using a processor when the one or more visual markings are applied to the legal text prior to placement of the legal text in the document and where the legal text contains English language grammar;
applying one of the visual markings to the legal text such that at least one of the portions of the legal text are visually enhanced;
wherein the one or more portions of legal text include at least one of (a) a primary if-then clause, (b) a secondary if-then clause, (c) a primary conjunction, (d) a secondary conjunction, (e) a primary exception, (f) a secondary exception, (g) a skeletal sentence portion, and (h) a cohesive phrase; and
wherein the set of visual markings includes at least one of (i) a sentence termination marking, (ii) a primary if-then marking, (iii) an explicit if-then marking, (iv) a secondary if-then marking, (v) a primary conjunction marking, (vi) a secondary conjunction marking, (vii) a primary exception marking, (viii) a secondary exception marking, (ix) a skeletal sentence marking, and (x) a cohesive phrase marking in addition to text characters being added within the document without modification of the paragraphing employed in the document.

24. The non-transitory computer readable media containing instructions for the method of claim 23 further comprising the steps of:
displaying a legend with the legal text; and
wherein the legend includes individual visual markings of the set of visual markings and respective descriptions of the individual visual markings.

25. The non-transitory computer readable media containing instructions for the method of claim 23 further comprising the steps of:
   determining whether one of the sentences in the legal text includes a primary if-then clause; and
   in response to a determination that one of the sentences in the legal text includes a primary if-then clause, applying the primary if-then marking to the legal text such that the primary if-then clause is visually enhanced.

26. The non-transitory computer readable media containing instructions for the method of claim 25 further comprising the steps of:
   determining whether one of the sentences in the legal text includes a secondary if-then clause; and
   in response to a determination that one of the sentences in the legal text includes a secondary if-then clause, applying the secondary if-then marking to the legal text such that the secondary if-then clause is visually enhanced.

27. The non-transitory computer readable media containing instructions for the method of claim 25 further comprising the steps of:
   determining whether the primary if-then clause is an implicit if-then clause; and
   in response to a determination that the primary if-then clause is an implicit if-then clause, applying the explicit if-then marking to the legal text such that the implicit if-then clause is transformed into an explicit if-then clause.

28. The non-transitory computer readable media containing instructions for the method of claim 23 further comprising the steps of:
   determining whether one of the sentences in the legal text includes a primary conjunction; and
   in response to a determination that one of the sentences in the legal text includes a primary conjunction, applying the primary conjunction marking to the legal text such that the primary conjunction is visually enhanced.

29. The non-transitory computer readable media containing instructions for the method of claim 28 further comprising the steps of:
   determining whether one of the sentences in the legal text includes a secondary conjunction; and
   in response to a determination that one of the sentences in the legal text includes a secondary conjunction, applying the secondary conjunction marking to the legal text such that the secondary conjunction is visually enhanced.

30. The non-transitory computer readable media containing instructions for the method of claim 28 wherein the primary conjunction marking comprises a box that surrounds the primary conjunction.

31. The non-transitory computer readable media containing instructions for the method of claim 23 further comprising the steps of:
   determining whether one of the sentences in the legal text includes a primary exception clause; and
   in response to a determination that one of the sentences in the legal text includes a primary exception clause, applying the primary exception marking to the legal text such that the primary exception clause is visually enhanced.

32. The non-transitory computer readable media containing instructions for the method of claim 31 further comprising the steps of:
   determining whether one of the sentences in the legal text includes a secondary exception clause; and
   in response to a determination that one of the sentences in the legal text includes a secondary exception clause, applying the secondary exception marking to the legal text such that the secondary exception clause is visually enhanced.

33. The non-transitory computer readable media containing instructions for the method of claim 31 wherein the primary exception marking comprises a first half-circle positioned at a beginning of the primary exception clause and a second half-circle positioned at an ending of the primary exception clause.

34. The non-transitory computer readable media containing instructions for the method of claim 23 further comprising the steps of:
   identifying a location in the legal text where one of the sentences ends; and
   applying the sentence termination marking at the location in the legal text where the sentence ends such that the location is visually enhanced.

35. The non-transitory computer readable media containing instructions for the method of claim 23 further comprising the steps of:
   determining whether one of the sentences in the legal text includes a cohesive phrase; and
   in response to a determination that one of the sentences in the legal text includes a cohesive phrase, applying the cohesive phrase marking to the legal text such that the cohesive phrase is visually enhanced.

36. The non-transitory computer readable media containing instructions for the method of claim 25, wherein the primary if-then marking comprises a pair of brackets wherein individual brackets in the pair of brackets are respectively positioned on each side of the primary if-then clause.

* * * * *